Aug. 7, 1928.

C. J. DUNZWEILER 1,680,038

STORAGE BATTERY

Filed Nov. 20, 1924

Inventor
Carl J. Dunzweiler
Thurston Kwis & Hadson
attys

Patented Aug. 7, 1928.

1,680,038

UNITED STATES PATENT OFFICE.

CARL J. DUNZWEILER, OF CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY.

Application filed November 20, 1924. Serial No. 750,981.

This invention relates to storage batteries, and has for its object to provide certain improvements which prevent or reduce to a minimum corrosion of the terminals by creepage of acid up along the terminal posts projecting through the covers of the cells.

The invention may be briefly summarized as consisting in certain novel details of construction, and combinations and arrangements of parts which will be described in the specification and set forth in the appended claim.

Figure 1:
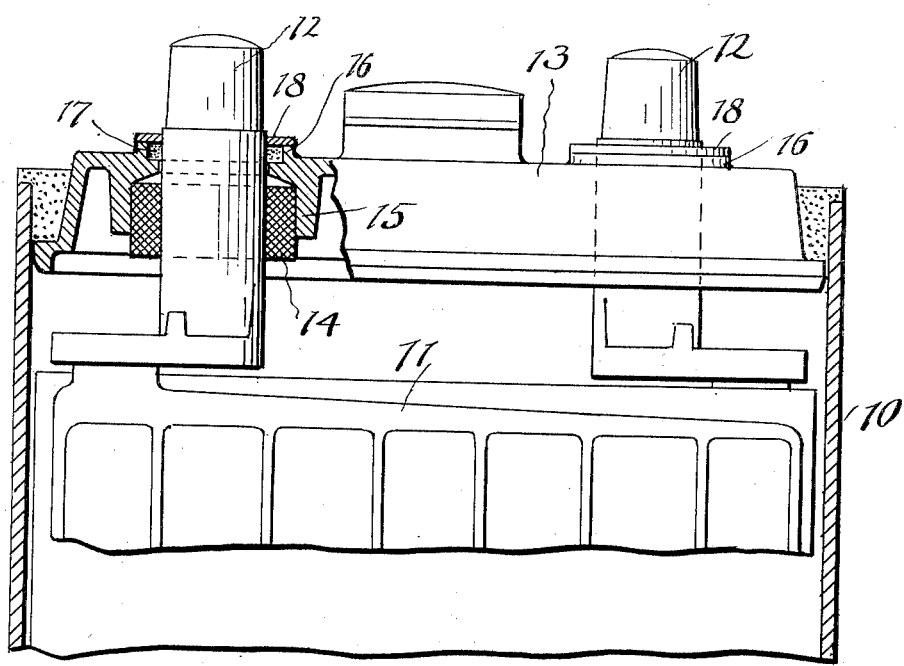
Figure 2:
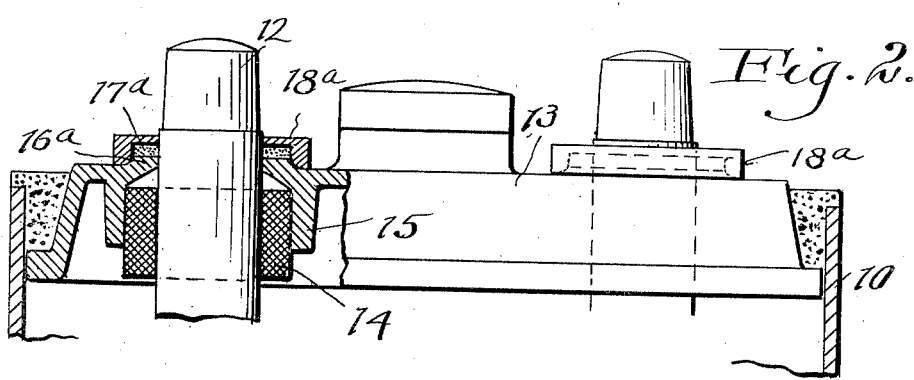
Figure 3:
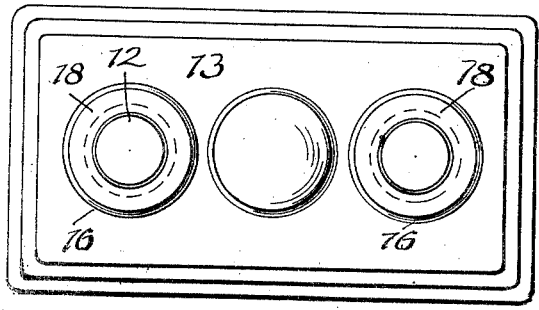

In the accompanying sheet of drawings, Fig. 1 is a vertical sectional view through a cell of a battery embodying my invention in one of its forms; Fig. 2 is a similar view showing a modification; and Fig 3 is a top plan view of the battery cell on a reduced scale.

Referring to the drawings, 10 represents a storage battery container which may be a jar or a multi-compartment container of any of the well-known forms. The container is adapted to receive the usual positive and negative plates 11, having positive and negative terminal posts 12 projecting up through the cell cover 13, which is generally formed of hard rubber. The posts may be sealed in the cover in any suitable way, but in this instance they are tightly fitted in soft rubber bushings 14, which in turn are fitted into annular flanges 15 on the under side of the cover 13.

To prevent corrosion of the terminals, the terminal posts are packed with grease where they project through the cover, and in this application I have shown two forms of the invention by which this result is accomplished in a very effective manner. In Fig. 1 the cover is provided around each terminal post 12 with a boss 16, which is provided with a depression 17 forming an annular groove which entirely surrounds the terminal post and is filled with grease. This may be provided for each of the two terminal posts of each cell of the battery, regardless of the number of cells of which it may be composed, but the grease packing need not be employed for those posts of a multi-cell battery which are connected by cross connectors extending from cell to cell, and which are usually lead-burned to the posts. In the latter case only the two end or terminal posts to which conductors are adapted to be attached, generally by clamps, need be provided with the grease packing. The grease-filled depression or groove 17 is closed by a cover 18, consisting preferably of a disk or washer of hard rubber, which is fitted tightly onto the terminal post, and seats upon the top of boss 16. Preferably the cover 18 is shrunk onto the post by being heated, and then slipped into place onto the top of the boss 16 so that when it cools, it remains tightly in place.

In Fig. 2 a slight modification is shown. In this instance each terminal post is surrounded by a washer $18^a$, hollowed out on the under side to form an annular cavity $17^a$ which is filled with grease, but the boss, here designated $16^a$, of the cover is not recessed. As in the first instance, the washer or cover $18^a$ is preferably formed of hard rubber, and is preferably shrunk in place on the post. As shown in Fig. 2, the washer $18^a$ has a flange-like periphery which fits down around the cover boss $16^a$.

It may be desirable to increase the grease space, in which event, both the boss of the cell cover and the washer could be recessed. In other words, the arrangement shown in both Figs. 1 and 2 might be used simultaneously at each terminal post.

By the present invention the terminal posts of the battery are packed with grease, which prevents the creepage of acid along the posts, and therefore prevents corrosion of the terminals which are attached to the posts, and the grease receptacle around each post, including the cover of the receptacle, is formed in an inexpensive manner.

Having described my invention, I claim:

A storage battery comprising a container having a boss with a terminal post opening therein, a terminal post projecting through said opening and adapted to be surrounded with corrosion preventing substance adjacent said boss, and a cover for the boss and opening shrunk onto the post to form a tight seal, whereby creepage of acid along the post is prevented.

In testimony whereof, I hereunto affix my signature.

CARL J. DUNZWEILER.